Aug. 31, 1937.  L. H. KAUPKE  2,091,480
PICKER ARM FOR POTATO PLANTERS
Filed June 5, 1935

Inventor
Lee H. Kaupke
By [signature] Att'y

Patented Aug. 31, 1937

2,091,480

UNITED STATES PATENT OFFICE 2,091,480

PICKER ARM FOR POTATO PLANTERS

Lee H. Kaupke, Auburn, N. Y., assignor to International Harvester Company, a corporation of New Jersey Application June 5, 1935, Serial No. 25,043

8 Claims. (Cl. 221—133)

This invention relates to potato planters of the type in which a series of pickers are caused to revolve around a shaft over a receiver for potatoes, these pickers having prongs to empale a piece of seed potato, and slotted concaves arranged in the receiver to press the potatoes on the prongs. The pickers are then caused to release the piece of seed potato by striking against a knock-off bar, said seed being delivered to the ground. In such devices there is a means for opening a furrow wherever the seed potatoes are to fall, and another device for closing the furrow.

The chief difficulty in the proper feeding of potatoes is that, if they are not fed regularly, there is a wasting of the potatoes or else irregular planting, owing to too many or too few being deposited from the pickers. This type of picker arm and planter is best disclosed in the United States patent to C. A. A. Rand 1,583,008, granted May 4, 1926, and filed August 9, 1924.

The main object of the invention is to provide a picker arm adaptable to work with any size of seed cutting, and this is accomplished by providing the picker arm with adjustable features wherein suitable picker heads may be substituted for each size of seed, such as a head for medium seed, large seed, and small seed, and also to increase the percentage of planting accuracy.

Another difficulty in feeding by means of a picker arm as above described is that the pickers in the past have not been adjustable as to the amount of projection of the pickers to empale the seed, so that, when small pieces of seed are desired, too many pieces would be delivered by the picks.

It is an object of this invention to provide means for adjusting the amount of the protruding picks to avoid this difficulty by substituting separate stripper plates for small, large, and medium size of seed.

Another object of this invention is to provide means whereby the picker arm stripper plates may be readily removed when it is desired to plant different sizes of seed.

In accomplishing the above objects and minor objects, which will hereinafter be more specifically described and then defined in the claims, the preferred forms of the improved details of structure are illustrated in the accompanying drawing, wherein:

Figure 1:
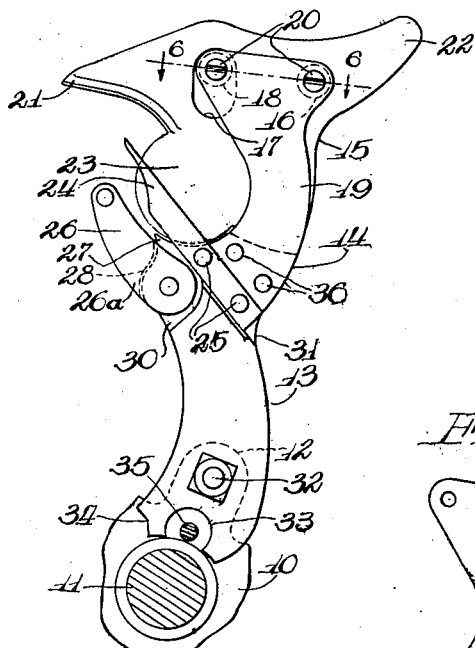
Figure 1 is a side elevation, showing the picker arm complete and mounted on the picker arm spider, and showing the picks in position for medium seeds.

The invention is herein disclosed in combination with a potato planter as shown in the U. S. Patent No. 1,583,008, granted to C. A. A. Rand, May 4, 1926, in which the picker arm spider 10 is rotatably mounted on the rigid axle 11. The picker arm spider has lugs 12, to which is bolted the completed picker arm 13. The completed picker arm 13 comprises a bifurcated picker arm 14 with the potato stripper plate 15 movable in the bifurcated portion. The potato stripper plate 15 is pivoted about a pivot point formed by a stud 16 on the picker arm 14 and is limited in its movement by the slotted portion 17 of the stripper plate 15 engaging a stop in the form of a stud 18 on the picker arm 14. In this manner the stripper plate may be swung from maximum open position by gravity to its engaging position over the seed when the seed is engaged by the concaves of the potato planter. The bifurcated portion of the picker arm, between which the stripper plate pivots, is formed by the upper portion of the picker arm 14 and the side plate 19, which is removably secured at the upper portion to the picker arm 14 through the internally threaded studs 16 and 18 and screws 20, securing the stripper plate 19 in the abutting position shown in Figure 6 to the studs 16 and 18, which constitute spacing means for the bifurcated portion of the picker arm. The forward portion of the stripper plate 15 has an enlarged finger engaging portion 21, as shown in Figure 1. The rear portion of the stripper plate 15 has a rearwardly extending heel piece 22, which engages the knock-off block on the potato planter when the seed is discharged to the seed chute.

Integrally of the mid-portion of the stripper plate 15 is the stripper portion 23, which passes between the usual picks 24 secured on each side of the picker arm 14 by the rivets 25. The picks 24 extend beyond the stripper portion to empale the seed as the picker arm passes through the mass of seed in the hopper. The picker arm shown in Figure 1 illustrates the stripper plate 15, which is used for medium size seed. The finger portion 21 and the stripper portion 23 are so proportioned to form a throat area for receiving the potato seed.

Figure 3:
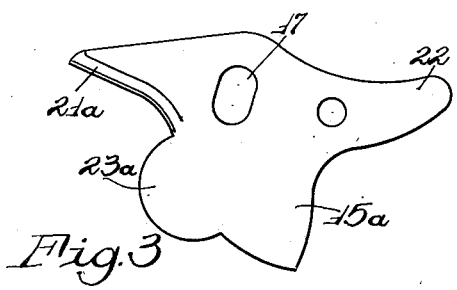
Figure 3 is a side elevation of the picker arm stripper plate used for small seed.

Figure 3 shows a potato stripper plate 15a, which is similar to the stripper plate 15, but is proportioned for the small size of seed.

Figure 4:
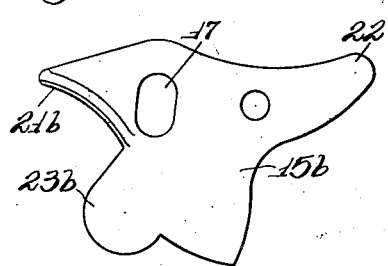
Figure 4 is a side elevation of the picker arm stripper plate used for large seed.

Figure 4 shows the stripper plate 15b, which is used for large seed. The construction of the stripper plate 15b shown in Figures 3 and 4 is similar in all other respects to the construction of the stripper plate 15 except that the stripper portion 23a and 23b are proportionally changed to accommodate the size of seed for which they were designed. It is shown in Figures 1, 3, and 4 that the shape of the finger portions 21a and 21b is likewise changed to accommodate the size of the seed to be used, as best shown in the superimposed position in Figure 1. It is thus seen that the picker arm designed with the interchangeable stripper plates 15, 15a, and 15b may be substituted one for the other to accommodate the conditions most frequently met in the planting of seed potatoes.

A thumb piece 26 is bifurcated at its lower end and pivotally connected to the picker arm 14, and it is limited in its movement as it passes through the seed in the hopper by the stop 27. As it passes through the seed in the uppermost position of the picker arm, the thumb piece falls and is limited in its movement by the stop portion 28 on the thumb piece 26. The thumb piece 26 has an enlarged surface portion similar to that of the enlarged finger portion 21 of the stripper plate. The thumb piece 26 is pivotally connected by the bifurcated portion formed by the thumb piece casting 26a and its side plate to the reduced portion 30 of the picker arm 14. The thumb piece is used to prevent doubling, that is, the picking of more than one seed portion. The thumb piece also acts to steady the potato seed in the picks 24.

The mid-portion 31 of the completed picker arm 13 is so proportioned that the picks 24 are symmetrically placed on each side of the stripper portion 23. The lower end of the completed picker arm 13 is secured to the lug 12 by the usual means of the carriage head bolt and nut 32, and the lower end of the picker arm is shaped to conform to the periphery of the spider 10. Cut-out portions 33 and 34 are located on the picker arm to accommodate the pawl rod 35 for the feed cam.

The number of these completed picker arms 13 that are used is six or eight, depending upon the gearing and mechanism used for the various plant spacings. These completed picker arms are placed in two groups of three or four, and laterally spaced on the spider.

Figure 5:
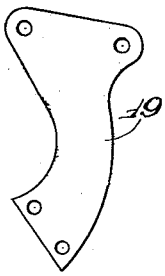
Figure 5 is a side elevation of the side plate.
Figure 2:
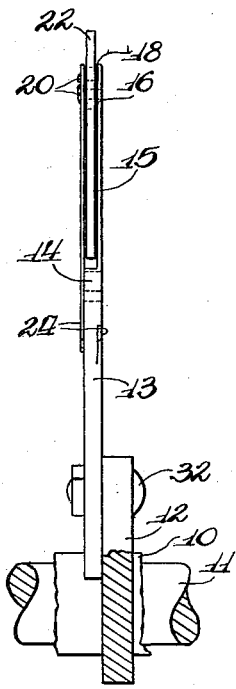
Figure 2 is a rear elevation of the picker arm and spider.

Figure 5 shows the side plate 19, which is made of thin, resilient, sheet spring steel, so that, when the screws 20 are removed, the piece 19, best shown in Figure 1, may be sprung forward and the stripper plate 15 removed, and another stripper plate, such as 15a or 15b may be readily substituted.

Figure 6:
Figure 6 is a section taken along the line 6—6 of Figure 1, showing the means for detaching the stripper plate from the picker head.
Figure 7:
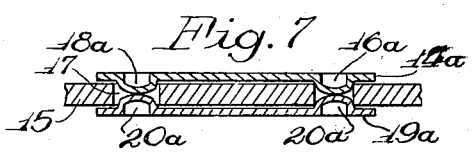
Figures 7 and 8 are views similar to Figure 6, showing additional modifications of the means for quickly detaching and replacing the stripper plates of the picker arm.

Figure 7 shows a modification of the upper portion 14a of the picker arm and also a modification 19a of the side plate 19 shown in Figure 5, whereby the usual stud portions 16 and 18 of Figure 1 have been modified, as shown by the stud portions 16a and 18a, as shown in Figure 7. The screws 20 of Figure 1, as best shown in Figure 6, have been modified by the indented portions 20a, as shown in Figure 7, of the side plate 19a. With this structure, as shown in Figure 7, the side plate 19a, being made from resilient sheet steel, may be bent forward and the stripper plate 15 may be readily removed. The portions 16a, 18a, and 20a perform the same functions as the pivot 16 and the stop 18, as shown in Figure 1.

Figure 8:
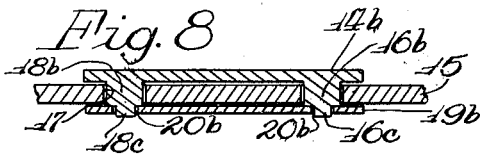

Figure 8 shows another modification of a means for quickly detaching the stripper plate 15 from the picker arm 14. In the modification, as shown in Figure 8, the studs 16b and 18b replace those shown in Figure 6, and the holes 20b in the side plate 19b, when interlocked with the portions 16c and 18c form a securing device which is adapted for the quick attaching and detaching of the stripper plate 15, as the side plate 19b, being resilient, may be readily sprung upwardly whereby the stripper plate 15 may be removed and, after a new stripper plate has been substituted, the resiliency of the side plate 19b prevents the stripper plate 15 from being disengaged. The stripper plates 19, 19a, and 19b are secured to the upper portion 14 of the picker arm by the rivets 36, best shown in Figure 1, so that the plates, being of resilient material, form a spring fastening means.

It is thus seen that a picker arm has been made, which is adjustable for various sizes of potato seed, including small, medium and large seed, and that it is sturdily constructed and very simple to adjust for each size of seed which the operator wishes to plant.

In the operation of a potato planter, it will be understood that the picker arms are positioned to travel in slots of the concave between the sections of the magazine and that their action is to empale or pick seed potatoes as the individual arms pass through the mass of potatoes in the bottom of the magazine, lifting them up and around to the forward side of the magazine where the heel piece 22 of the stripper plate 15 strikes an abutment on the frame, causing the potatoes to be stripped from the prongs of the picks 24 by the stripper portion 23 of the stripper plate 15, and dropped. The thumb piece 26 is adapted to gauge the depth of the prongs when large seeds are used. The enlarged finger portion 21 acts to center the seed prior to empalement of the seed by the picks 24. The slot 17 limits the movement of the stripper plate 15. The picks 24 are laterally spaced and placed approximately one-half inch apart, so that the seed may be empaled without splitting the same and losing it from the pick as it travels through the mass of seed in the magazine of the potato planter.

It will be evident that there has been provided a picker arm for the spider of a potato planter, which may be readily connected to and disconnected from the spider, and in which the stripper plates of the picker arm may be removed and another substituted, so that small, medium and large seeds may be planted without the necessity of changing over the entire picker arms, but, by merely quickly attaching and detaching the stripper plate. It will be evident from this disclosure that means have been provided in which the accuracy of the usual planter, having the usual picker head, may be increased when a suitable stripper plate, accurately proportioned, may be readily substituted for the size of seed to be planted.

It is to be understood that materials suitable for the stresses encountered in a potato picker arm of this nature are to be used, and that the preferred embodiment of the invention herein described is capable of certain modifications without departure from the scope of the invention to be defined in the appended claims.

What is claimed is:

1. In a potato planter, the combination with a picker comprising a picker arm and picking means mounted on said picker arm adapted for spearing potato seed, of a bifurcated portion on said picker arm adapted to receive a stripper plate, and quickly detachable means on the bifurcated portion of the picker arm whereby a stripper plate may be pivotally mounted on said picker arm and secured thereto, comprising separable pivot and stop members each including spacing means for the bifurcated portion of the picker arm.

2. In a potato planter, the combination with a picker comprising a picker arm and picking means mounted on said arm adapted for spearing potato seed, of a stripper plate having a finger portion and a stripper portion whereby a predetermined throat portion with respect to the picking means may be formed to receive a seed portion of a certain size, and quickly detachable means on the picker arm whereby a stripper plate for one size of seed potato may be readily removed so that a stripper plate of another size may be readily substituted, comprising separable spaced members on the picker arm between which the stripper plate is supported.

3. In a picker as set forth in claim 2, the aforesaid stripper plate pivotally mounted on the picker arm for reciprocatory movement in a vertical plane, the aforesaid quickly detachable means comprising a stud portion for pivotally mounting the stripper plate thereon, a stop member for limiting the movement of the stripper plate in either direction, and resilient means secured to the picker arm for securing the stripper plate in attached position.

4. In a picker as set forth in claim 2, the aforesaid stripper plate pivotally mounted on the picker arm for reciprocatory movement in a vertical plane, the aforesaid quickly detachable means comprising a stud portion for pivotally mounting the stripper plate thereon, a stop member for limiting the movement of the stripper plate in either direction, resilient means secured to the picker arm for securing the stripper plate in attached position, and detachable means mounted in the aforesaid stud portion and stop member for securing the aforesaid resilient means thereto.

5. In a picker as set forth in claim 2, the aforesaid stripper plate pivotally mounted on the picker arm for reciprocatory movement in a vertical plane, the aforesaid quickly detachable means comprising stud means on the picker arm acting as a pivot for the stripper plate and as a stop for limiting the movement of the stripper plate in either direction, resilient means secured to the picker arm for securing the stripper plate in attached position, said resilient means having stud means complementary to the stud means on the picker arm acting respectively as a pivot for the stripper plate and as a stop for limiting the movement of the stripper plate in either direction, whereby a quickly detachable pivot and stop means may be provided for quickly attaching and detaching the stripper plate.

6. In a picker as set forth in claim 2, the aforesaid stripper plate pivotally mounted on the picker arm for reciprocatory movement in a vertical plane, the aforesaid quickly detachable means comprising stud means on the picker arm acting as a pivot for the stripper plate and as a stop for limiting the movement of the stripper plate in either direction, resilient means secured to the picker arm for securing the stripper plate in attached position, and means for latching said resilient means to the picker arm, the aforesaid means comprising latching means on the stud means, and complementary latching means on the resilient means, whereby the stripper plate may be quickly attached and detached.

7. In a potato planter, the combination with a picker comprising a picker arm and picking means mounted on said picker arm adapted for spearing potato seed, of a bifurcated portion on said picker arm adapted to receive a stripper plate, said bifurcated portion comprising members adapted to be spread apart for receiving a stripper plate, and cooperating means on said bifurcated portion adapted to mount a stripper plate thereon and to secure said stripper plate in position.

8. In a potato planter, the combination with a picker comprising a picker arm and picking means mounted on said picker arm adapted for spearing potato seed, of a bifurcated portion on said picker arm adapted to receive a stripper plate, said bifurcated portion comprising a rigid portion and a resilient portion, whereby said resilient portion may be spread apart relative to the rigid portion in order that a stripper plate may be mounted between said portions.

LEE H. KAUPKE.